(12) United States Patent
Yoo

(10) Patent No.: US 7,050,083 B2
(45) Date of Patent: May 23, 2006

(54) SUB-SCANNING INTERVAL ADJUSTING APPARATUS FOR MULTI-BEAM LASER SCANNING UNIT

(75) Inventor: Jae-hwan Yoo, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 9 days.

(21) Appl. No.: 10/437,185

(22) Filed: May 14, 2003

(65) Prior Publication Data

US 2004/0036760 A1     Feb. 26, 2004

(30) Foreign Application Priority Data

Aug. 23, 2002   (KR)   ............................... 2002-49961

(51) Int. Cl.
*B41J 27/00*     (2006.01)
(52) U.S. Cl. ...................................... 347/241; 347/256
(58) Field of Classification Search ................ 347/235, 347/241–245, 250, 256–258, 233–234, 248; 359/198, 640
See application file for complete search history.

(56) References Cited

U.S. PATENT DOCUMENTS

| | | | |
|---|---|---|---|
| 4,878,066 A | | 10/1989 | Shiraishi ...................... 347/235 |
| 5,210,635 A | * | 5/1993 | Nagata et al. ................. 359/198 |
| 5,771,061 A | * | 6/1998 | Komurasaki et al. ........ 347/242 |
| 5,818,496 A | | 10/1998 | Hirose et al. ................. 347/234 |
| 5,844,591 A | | 12/1998 | Takamatsu et al. .......... 347/235 |
| 6,038,076 A | * | 3/2000 | Bouzid et al. ................ 359/640 |

FOREIGN PATENT DOCUMENTS

| | | |
|---|---|---|
| EP | 0703088 | 3/1996 |
| JP | 03168715 | 7/1991 |
| JP | 2002174785 | 6/2002 |

\* cited by examiner

*Primary Examiner*—Hai Pham
(74) *Attorney, Agent, or Firm*—Staas & Halsey LLP

(57) ABSTRACT

A sub-scanning interval adjusting apparatus for a multi-beam laser scanning unit adjusts an interval between at least two laser lines that are formed on a photoreceptor drum without causing starting points of image formation to vary. In the multi-beam laser scanning unit simultaneously emitting at least two laser beams by using at least two laser sources, the sub-scanning interval adjusting apparatus includes a transparent member varying in thickness depending on its height, in a direction where the laser beams pass through, the transparent member having an inclined lower side with respect to a scanning direction of the laser beams, and a movable member having an inclined side corresponding to the inclined lower side of the transparent member, thereby adjusting an interval between the laser beams by moving the movable member in the scanning direction and thus varying the height of the transparent member with respect to the laser sources. An elastic member is formed on the transparent member to press the transparent member with respect to the movable member. The transparent member is formed to have a shape of a triangle or a trapezoid in cross-section in the direction where the laser beams pass through. The transparent member has a refractivity greater than 1.

44 Claims, 6 Drawing Sheets

SUB-SCANNING INTERVAL ADJUSTING APPARATUS FOR MULTI-BEAM LASER SCANNING UNIT

CROSS-REFERENCE TO RELATED APPLICATIONS

This application claims the benefit of Korean Patent Application No. 2002-49961, filed Aug. 23, 2002, in the Korean Intellectual Property Office, the disclosure of which is incorporated herein by reference.

BACKGROUND OF THE INVENTION

1. Field of the Invention

The present invention generally relates to a multi-beam laser scanning unit used in an image forming apparatus, such as a laser printer, and more particularly, to a sub-scanning interval adjusting apparatus of a multi-beam laser scanning unit adjusting a distance between at least two beams of the multi-beam laser scanning unit.

2. Description of the Related Art

Generally, a laser printer forms an image by processes of processes of focusing a laser beam from a laser scanning unit onto a photoreceptor drum in accordance with a video signal, developing an electrostatic latent image on the photoreceptor drum, and transferring the developed image onto a printing medium such as a paper. An exemplary structure of the laser scanning unit for use in the laser printer is shown in FIG. 1.

Referring to FIG. 1, the laser scanning unit is provided with a laser source 10, a collimating lens 11, a cylinder lens 12, a polygon mirror 13, an f-theta lens 15, and a reflective mirror 16.

The laser source 10 generates a laser beam 1, and usually a laser diode is used as the laser source.

The collimating lens 11 transforms the laser beam 1 from the laser diode 10 into a parallel or convergence ray of light (laser beam 1 having parallel rays) with respect to an optical axis.

The cylinder lens 12 focuses the laser beam 1 passed through the collimating lens 11 onto a surface of the polygon mirror 13 in a form of a line in a horizontal direction.

The polygon mirror 13 is rotated by a motor 14 at a constant speed to perform scanning by displacing the laser beam 1 passed through the cylinder lens 12 with a constant linear velocity in the horizontal direction.

The f-theta lens 15 has a predetermined refractivity with respect to the optical axis, deflects the laser beam 1 reflected from the polygon mirror 13 at constant velocity towards the main scanning direction (arrow A), and compensates for aberrations, thereby focusing the laser beam 1 on the scanning surface.

The reflective mirror 16 reflects the laser beam 1 passed through the f-theta lens 15 towards a certain direction, thereby focusing the laser beam 1 on a surface of a photoreceptor drum 17 in a form of a dot.

Further provided is an optical sensor 19 for horizontal-synchronizing the laser beam 1. The optical sensor 19 is provided with a synchronization signal detecting reflective mirror 18, which reflects the light passed through the f-theta lens 15 towards the optical sensor 19.

The above-mentioned components are assembled in a single frame (not shown) to form the laser scanning unit. Further, a transparent glass member (not shown) is attached to an outer side of the frame to prevent foreign substances, such as dust, from being introduced into the laser scanning unit.

Increasingly, demands on the laser printer that prints at a higher printing speed have been growing. In order to increase the printing speed of the laser printer, a scanning speed of the polygon mirror 13 needs to be increased. And in order to increase the scanning speed, an R.P.M of the motor 11 has been increased to increase the R.P.M of the polygon mirror 13. This way, however, has been accompanied by problems, such as an increase of noise, and also a high material cost mainly due to the requirement for a high-speed motor.

In an attempt to solve the above-mentioned problems, recently employed is a multi-beam laser scanning unit that has a plurality of light sources. In this case, if the multi-beam laser scanning unit having two light sources is employed to guarantee the constant printing speed, the motor 14 for the polygon mirror 13 has a half R.P.M of a general motor.

With the multi-beam laser scanning unit, two lines of a given resolution are simultaneously formed on the photoreceptor drum 17 in a perpendicular direction (hereinafter called 'sub-scanning direction') in relation to the main scanning direction.

In the meantime, when components of the laser scanning unit are assembled, errors inevitably occur due to assembling status or precision of the respective components.

Accordingly, a space interval between two lines in the sub-scanning direction is deviated from a normal interval that is predetermined for the corresponding resolution. And this usually causes an undesired phenomenon, so-called 'jittering', in the laser printer with high-resolution, deteriorating a sharpness of a printing image.

In order to solve the above-mentioned problems, as shown in FIG. 2, an apparatus 20 is provided to adjust an interval between multi-beams in the sub-scanning direction.

Referring to FIG. 2, the multi-beam interval adjusting apparatus 20 includes a substrate 21 and a sub-assembling plate 23.

The substrate 21 is mounted with a laser diode 22 as a light source, and a circuit driving the laser diode 22. The sub-assembling plate 23 has a lens barrel 23-1 formed at a center thereof, and a plurality of elliptical holes 23-3 allowing the sub-assembling plate 23 to rotate about the lens barrel 23-1 by a predetermined angle. Assembled in the lens barrel 23-1 is a collimating lens 24. A tap hole 23-2 is formed on the sub-assembling plate 23 to secure the substrate 21 on the assembling plate 23. The substrate 21 is assembled with respect to the sub-assembling plate 23 by screws 26 through screw holes 21-1. Then, after the lens barrel 23-1 of the sub-assembling plate 23 is inserted in a hole 25-1 formed on the frame 25, the sub-assembling plate 23 is fastened to the frame 25 with screws 27. The screws 27 are fastened to the frame 25 through the elliptical holes 23-3 of the sub-assembling plate 23 and screw holes 25-2 of the frame 25. Accordingly, the lens barrel 23-1 of the sub-assembling plate 23 is adjustable in a precise position with respect to the hole 25-1 of the frame 25.

Accordingly, when laser light (a laser beam) is emitted from the laser diode 22, the laser beam passes through the lens barrel 23-1 and is incident on the collimating lens 24 and concentrated thereon in a form of a parallel ray.

In a case that the two lines of the laser beam concentrated on the photoreceptor drum 17 in the sub-scanning direction are disposed at an interval while being deviated from a predetermined interval, such deviation is adjusted by minutely moving and fastening the sub-assembling plate 23 on the frame using the screws 27.

However, the multi-beam interval adjusting apparatus 20 as described above has a shortcoming. That is, the image formation of the two laser lines in the scanning direction starts from different positions. By way of one example, FIG. 3A shows two laser diodes 22-1, 22-2 that are provided on the same line and in perpendicular relation with respect to the scanning direction, and at a predetermined interval (p). As are predetermined, the two lines are formed on the photoreceptor drum 17 at the predetermined interval (p). Then when the two lines are formed at an interval other than the predetermined interval (p), such deviation is adjusted by adjusting the interval between the laser diodes. Accordingly, the sub-assembling plate 23 is rotated to adjust the interval between the two lines as predetermined. However, while the interval between the two laser diodes 22-1, 22-2 in the sub-scanning direction becomes p', the laser diodes 22-1, 22-2 are deviated from a predetermined plane in the main scanning direction by a distance (Δ) (see FIG. 3B). As a result, the image formation in the scanning direction starts differently. Such a problem can be solved by employing a software or device for compensation.

However, employment of the compensation software or device causes a structure of the laser scanning unit to be complex, and a material cost increases.

SUMMARY OF THE INVENTION

Accordingly, it is an aspect of the present invention to provide a sub-scanning interval adjusting apparatus of a multi-beam laser scanning unit adjusting an interval in a sub-scanning direction between two lines of laser light with ease without having deviation of starting positions of the laser light of image formation in a scanning direction.

Additional aspects and advantages of the invention will be set forth in part in the description which follows and, in part, will be obvious from the description, or may be learned by practice of the invention.

In order to accomplish the above and/or other aspects of the invention, a sub-scanning interval adjusting apparatus of a multi-beam laser scanning unit adjusts an interval between at least two laser beams using the laser beams being simultaneously emitted from the at least two laser sources of the multi-beam laser scanning unit and includes a transparent member arranged on an optical path of the laser beams to adjust the interval between the laser beams.

The transparent member varies in thickness depending on its height in a direction where the laser beams pass through, and is either a triangle or a trapezoid in cross-section in the direction where the laser beams pass through.

According to another aspect of the present invention, a sub-scanning interval adjusting apparatus of a multi-beam laser scanning unit adjusting an interval between at least two laser beams uses the laser beams being simultaneously emitted from the at least two laser sources of the multi-beam laser scanning unit and includes a transparent member varying in thickness depending on its height in a direction where the laser beams pass through, and a movable member adjusting the transparent member in height. Accordingly, the interval between the laser beams is adjusted by adjusting the height of the transparent member with respect to the laser sources using the movable member.

According to another aspect of the present invention, an elastic member is formed on the transparent member to press the transparent member.

According to another aspect of the present invention, a sub-scanning interval adjusting apparatus of a multi-beam laser scanning unit adjusting an interval between at least two laser beams uses the laser beams being simultaneously emitted from at least two laser sources of the multi-beam laser scanning unit and includes a transparent member varying in thickness depending on its height in a scanning direction where the laser beams pass through, the transparent member having an inclined lower side towards the scanning direction of the laser beams, and a movable member having an inclined side corresponding to the inclined lower side of the transparent member. Accordingly, the interval between the laser beams is adjusted when the movable member moves towards the scanning direction and thus adjusts the height of the transparent member with respect to the laser sources.

According to another aspect of the invention, the transparent member is triangular or trapezoidal in cross-section in the direction where the laser beams pass through. The transparent member has an optical refractivity great than 1.

With a sub-scanning interval adjusting apparatus for a multi-beam laser scanning unit according to the present invention, an interval between a plurality of laser beams in a sub-scanning direction can be easily adjusted without causing starting points of image formation in a scanning direction to be deviated from each other. Since there is no need to employ software or a device to compensate for the deviation of the image formation starting points, construction of the scanning unit becomes simplified, and a cost of a material is reduced.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF EMBODIMENTS

Figure 1:
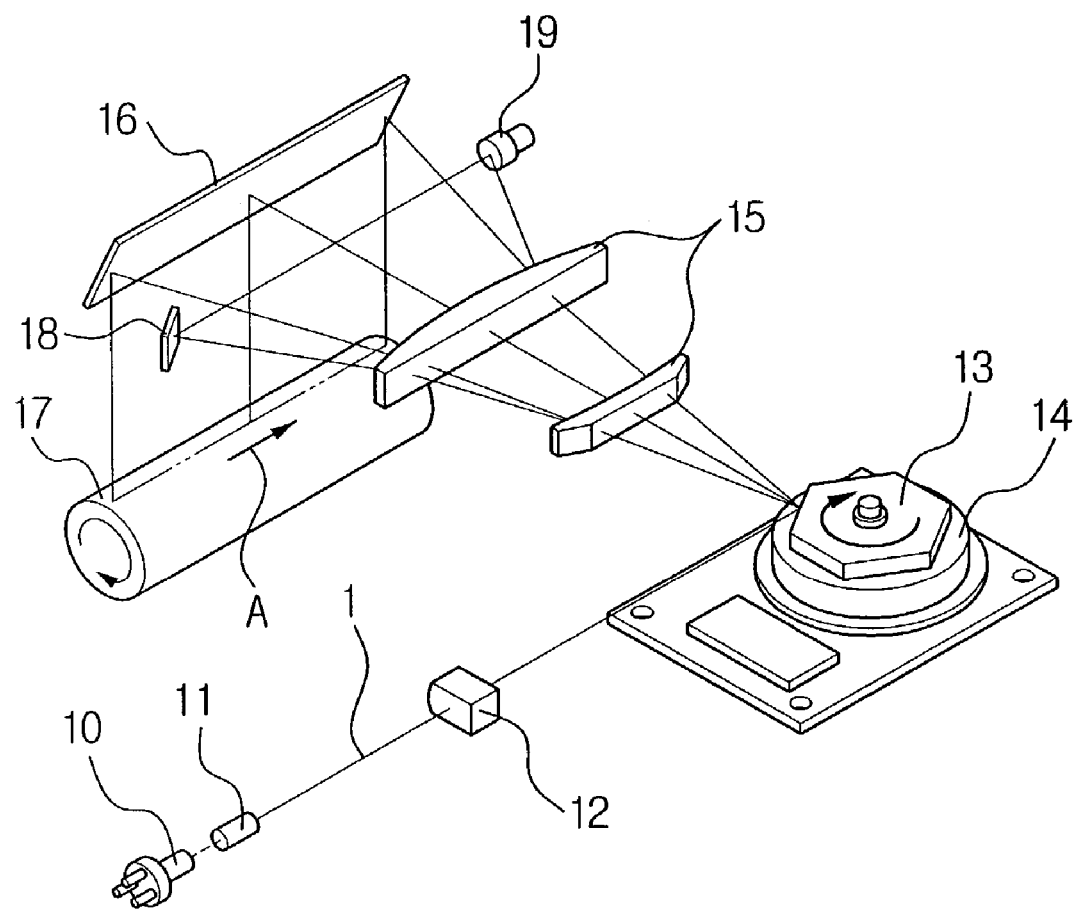
FIG. 1 is a view showing a structure of a conventional laser scanning unit.
Figure 2:
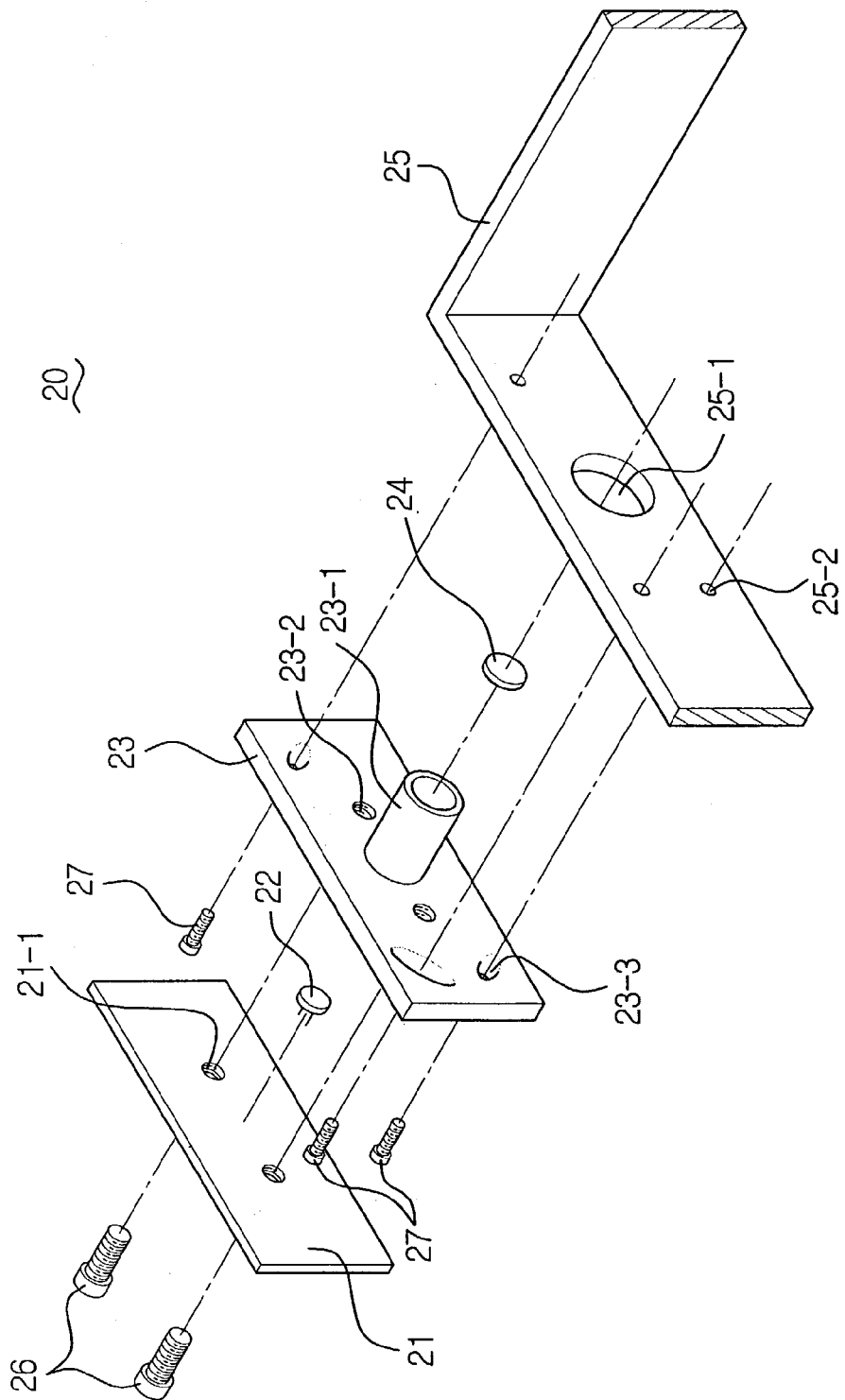
FIG. 2 is an exploded perspective view of an apparatus for adjusting an interval in a sub-scanning direction for the conventional multi-beam laser scanning unit of FIG. 1.
Figure 3A:
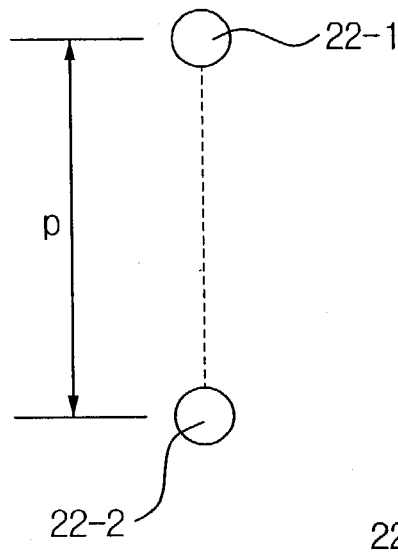
FIGS. 3A and 3B are views showing deviations in starting points of image formation due to an interval adjustment of the interval adjusting apparatus of FIG. 2.
Figure 3B:
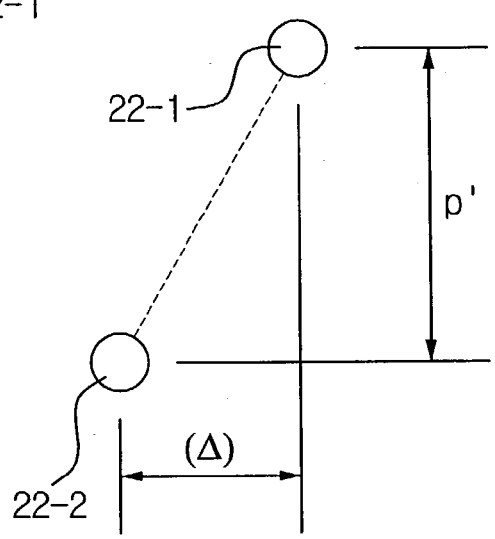

Reference will now be made in detail to embodiments of the present invention, examples of which are illustrated in the accompanying drawings, wherein like reference numerals refer to the like elements throughout. The embodiments are described in order to explain the present invention by referring to the figures.

Figure 4:
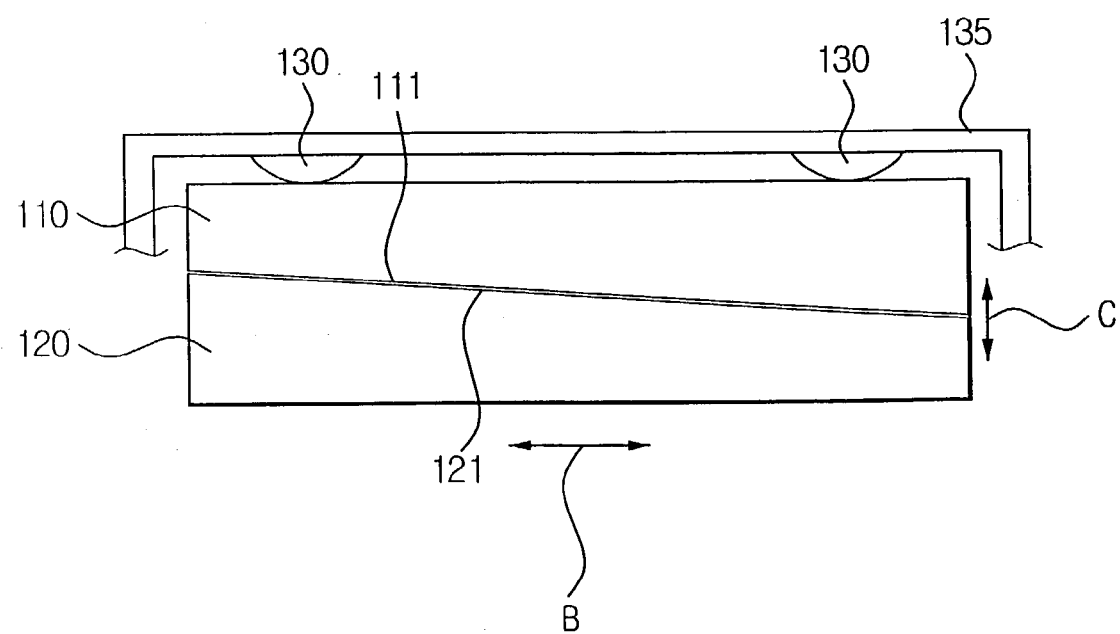
FIG. 4 is a view showing an apparatus for adjusting an interval in a sub-scanning direction for a multi-beam laser scanning unit according to an embodiment of the present invention.
Figure 5:
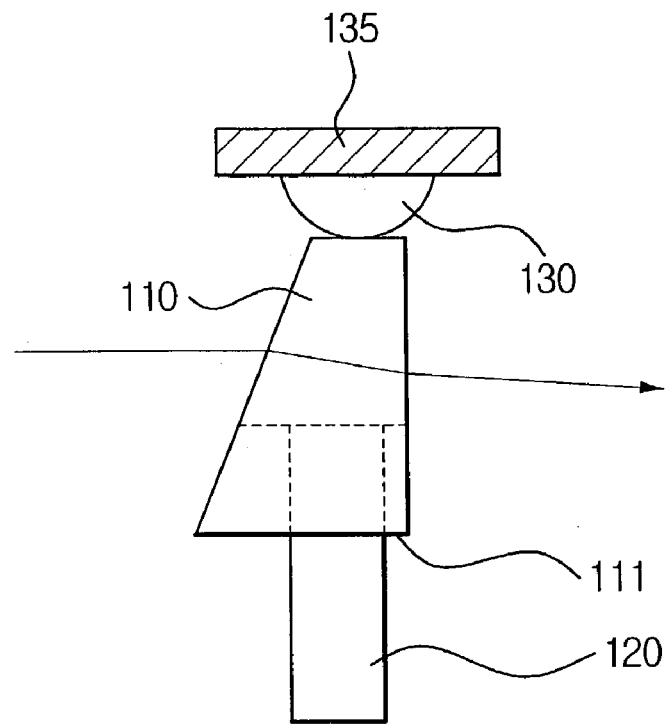
FIG. 5 is a side view of the interval adjusting apparatus of FIG. 4.

Hereinafter, the present invention will be described in detail with reference to the accompanying drawings. Referring to FIGS. 4 and 5, a sub-scanning interval adjusting apparatus 100 for a multi-beam laser scanning unit according to an embodiment of the present invention includes a transparent member 110, a movable member 120 and an elastic member 130.

The transparent member 110 is made of a material, such as glass or plastics, through which a laser beam passes. The transparent member 110 is generally formed by injection molding. The transparent member 110 has a predetermined optical refractivity, and it is possible that the refractivity is more than 1. A cross-section of the transparent member 110 may vary in thickness in accordance with a height direction, i.e., a direction (a sub-scanning direction as indicated with an arrow C) perpendicular to a laser scanning direction as indicated with an arrow B. It is possible that a lower portion is thicker while an upper portion is thinner. FIG. 5 shows one example of a structure of the transparent member 110 in section, which has a shape of a trapezoid. Alternatively, the transparent member 110 may be a triangle in cross-section. The transparent member 110 has a lower side 111 formed at a predetermined angle with respect to a lengthwise direction (the arrow B), i.e., the scanning direction.

The movable member 120 has an upper side 121 formed at an angle corresponding to the angle of the lower side 111 of the transparent member 110. The upper side 121 of the movable member 120 is slidable with respect to the lower side 111 of the transparent member 110. The movable member 120 is also provided with a driving unit (not shown) moving the movable member 120 leftward and rightward, i.e., in the scanning direction (the arrow B). Accordingly, as the movable member 120 is moved leftward and rightward, the transparent member 110 is moved upward and downward (the arrow C).

The elastic member 130 is placed on the transparent member 110, pressing the transparent member 110 with a predetermined pressure with respect to the movable member 120. Being secured in a certain position of a frame 135 of a scanning unit, the elastic member 130 also serves to secure the transparent member 110 at a certain position in an optical path of the laser beam. The elastic member 130 is made of any material that has a flexibility, and a compression spring may be used as the elastic member 130.

An operation of the sub-scanning interval adjusting apparatus for the multi-beam scanning unit having the above structure, will be described below.

When two laser lines are concentrated (formed) on a photoreceptor drum 17 (FIG. 1) at an interval deviated from the predetermined interval, by driving the driving unit, the movable member 120 is moved leftward or rightward, i.e., in the scanning direction (the arrow C). If the movable member 120 is moved rightward, the transparent member 110 is moved upward by sliding along the inclined lower side 111. If the movable member 120 is moved leftward, the transparent member 110 is moved downward by sliding along the inclined lower side 111, and the downward movement of the transparent member 110 is carried out easily by a recovering force of the elastic member 130. As the transparent member 110 is moved upward and downward with respect to the optical path of the two laser beams, the optical path changes by the transparent member 110, and as a result, the interval between the two laser lines can be adjusted.

A principle of adjusting the interval between the two laser lines through the upward and downward movement of the transparent member 110 will be described below in greater detail.

Figure 6:
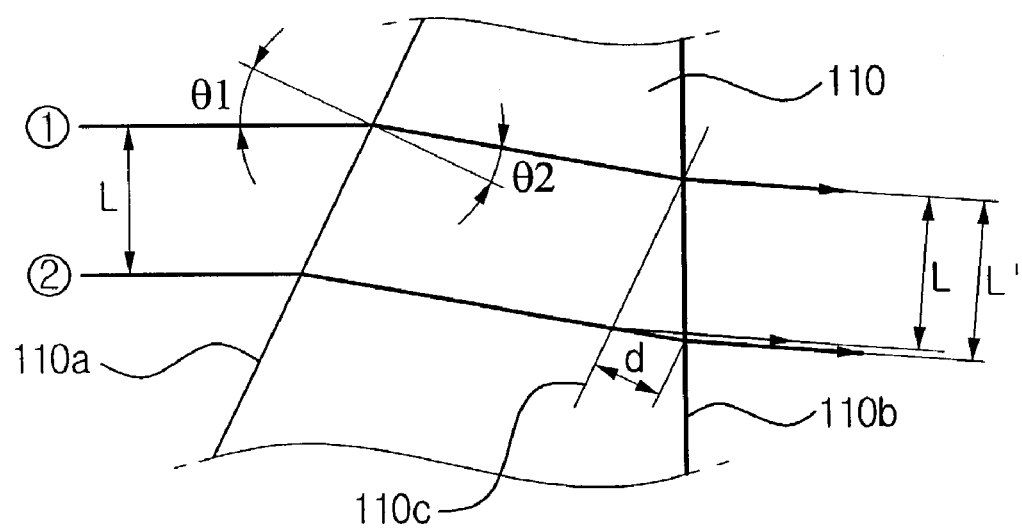
FIG. 6 is a view showing a change in an optical path of a laser beam passing through a transparent member of the interval adjusting apparatus of FIG. 4.

FIG. 6 shows a process in which the optical path of the laser beam incident on the transparent member 110 changes as the laser beam passes through the transparent member 110. The laser beam passing through the transparent member 110 satisfies the following equation of the Snell's law.

$$\sin \theta_1 = n \cdot \sin \theta_2 \qquad \text{Equation 1}$$

where n is a refractivity of the transparent member 110, $\theta_1$ is an angle of the laser beam being incident on the transparent member 110 with respect to a surface perpendicular to an incident surface 110a of the transparent member 110, and $\theta_2$ is an angle of the laser beam having been incident on the transparent member 110 with respect to the surface perpendicular to the incident surface 110a of the transparent member 110.

In FIG. 6, an upper laser beam of two laser beams emitted from two laser diodes is indicated as a laser beam ①, while a lower laser beam is indicated as a laser beam ②. An interval between the two incident laser beams ①, ② is L. When the optical path leads the two laser beams ①, ② through the transparent member 110c having a uniform thickness, the interval between the laser beams ①, ② emitted from the transparent member 110c is as much as L. However, when the optical path leads the two laser beams ①, ② through the transparent member 110b having a variable thickness, the interval between the two laser beams ①, ② emitted from the transparent member 110b is changed from L to L'. This is because of different optical distances of optical paths of the two laser beams ①, ② with respect to the a plane 110c parallel to the incident surface 110a of transparent member 110, and an exit surface 110b. An optical distance is obtained by multiplying the refractivity n of a medium by a thickness d of the medium.

Even with the transparent member 110 that is formed in the uniform thickness, a difference between the optical distances of the two laser beams ①, ② occurs if the upper and lower laser beams fall onto the transparent member 110 in non-parallel relation with each other.

Figure 7A:
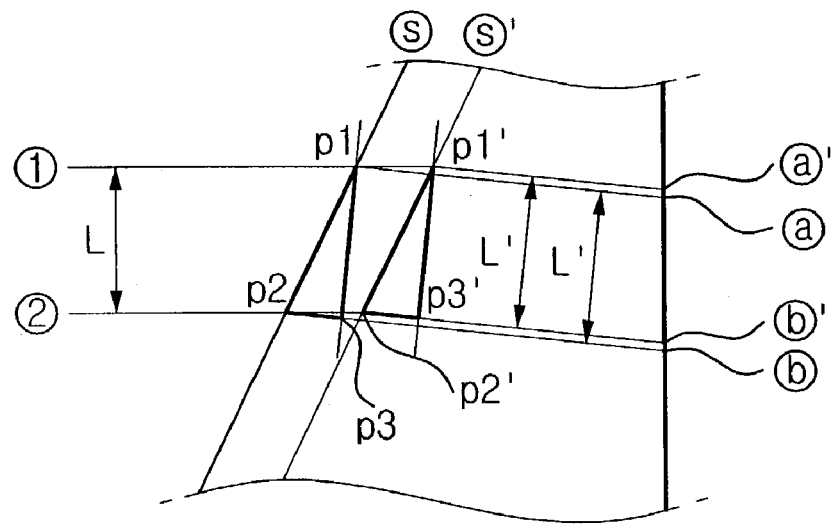
FIG. 7A is a view showing a change in the optical path of two parallel laser beams passing through the transparent member of the interval adjusting apparatus of FIG. 4.
Figure 7B:
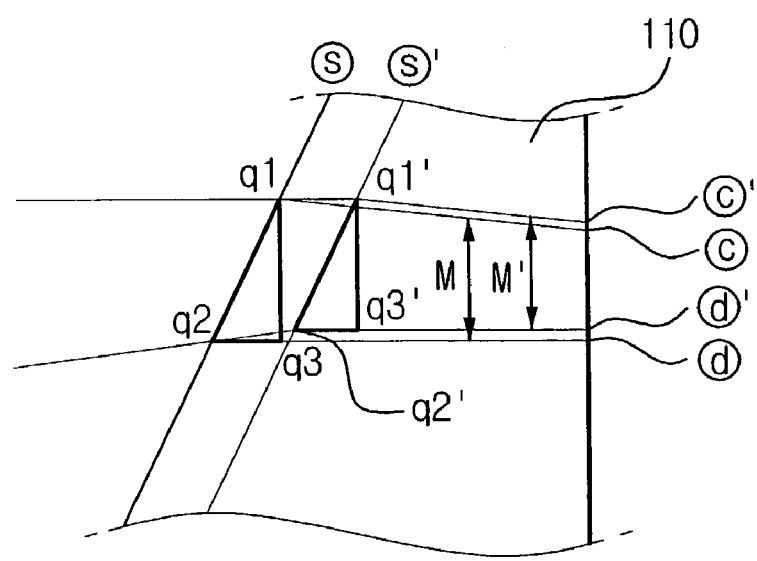
FIG. 7B is a view showing a change in the optical path of two non-parallel laser beams passing through the transparent member of the interval adjusting apparatus of FIG. 4.

FIGS. 7A and 7B show a changing interval between the two laser beams being incident on the transparent member 110 that varies in thickness in cross-section.

FIG. 7A shows a situation where the parallel laser beams are incident. The upper laser beam is indicated by ①, and the lower laser beam is indicated by ②. The upper and lower laser beams ①, ② are at an interval L. With the transparent member 110 being at a position ⓢ, the laser beams ①, ② pass through the transparent member 110 and exit respectively from points ⓐ, ⓑ. The interval between the exit laser beams is L'. Then when the transparent member 110 is moved by the movable member downward to another position ⓢ', the laser beams ①, ② pass through the transparent member 110 and exit respectively from points ⓐ', ⓑ'. The interval between the exit laser beams is L'. The optical path of the two laser beams varies by p2p3 and p2'p3' depending on and the position ⓢ'. As noted from FIG. 7A, a triangle p1p2p3 and another triangle p1'p2'p3' are congruent, and thus, the optical paths p2p3 and p2'p3' are identical in length.

Accordingly, the interval L' between the two laser beams can be kept constant even when the thickness of the transparent member 110 varies.

FIG. 7B shows two non-parallel laser beams being incident on the transparent member 110. The upper laser beam is indicated by ①while the lower laser beam is indicated by ②. With the transparent member 110 being at the position ⓢ, the upper and lower laser beams ①, ② pass through the transparent member 110 and exit respectively from the points ⓒ, ⓓ. The interval between the exit laser beams is M. Then when the transparent member 110 is moved by the movable member downward to the position ⓢ', the laser beams ①, ② pass through the transparent member 110 and exit respectively from the points ⓒ', ⓓ'. The interval between the exit laser beams is M'. The optical path of the two laser beams ①, ② varies by q2q3 and q2'q3' depending on the positioning of the transparent member 110 in position ⓢ and position ⓢ'. As noted from FIG. 7B, a triangle q1q2q3 and another triangle q1'q2'q3' are similar in certain proportion. Accordingly, the optical paths q2q3 and q2'q3' are in the same proportion. That is, as the transparent member 110 varies in thickness, the interval between the laser beams passing through the transparent member 110 also varies. Accordingly, by varying the transparent member 110 in thickness as described above, the interval between the two laser lines on the photoreceptor drum is adjusted to a predetermined value.

Figure 8:
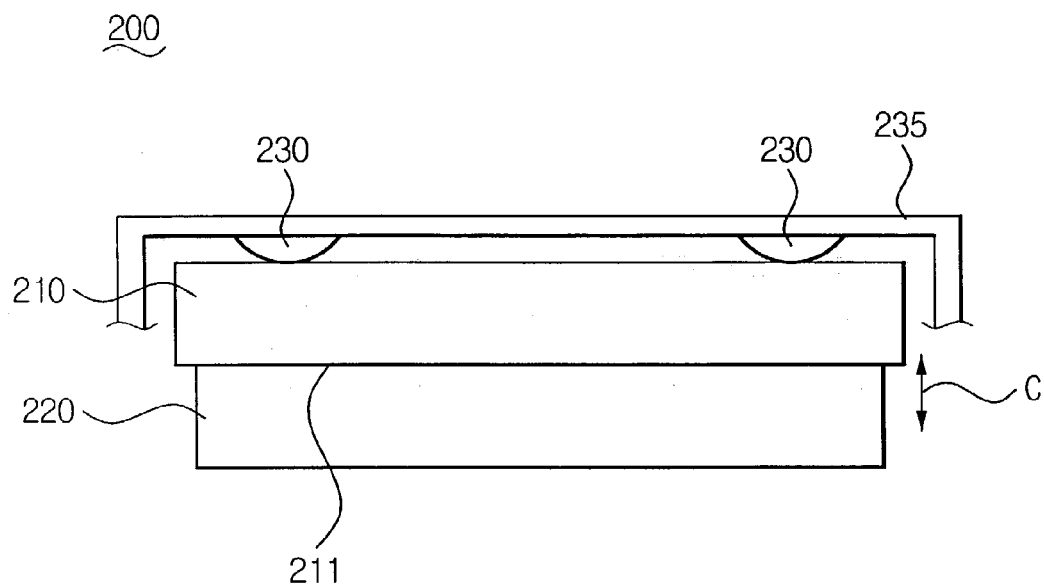
FIG. 8 is a view showing another apparatus for adjusting an interval in a sub-scanning direction for a multi-beam laser scanning unit according to another embodiment of the present invention.
Figure 9:
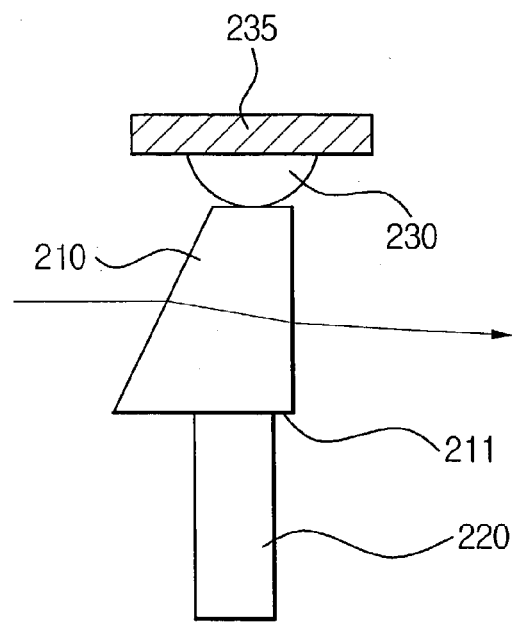
FIG. 9 is a side view of the interval adjusting apparatus of FIG. 8.

FIGS. 8 and 9 shows an apparatus 200 adjusting an interval in a sub-scanning direction for a multi-beam scanning unit according to another embodiment of the present invention.

The sub-scanning interval adjusting apparatus 200 for the multi-beam scanning unit includes a transparent member 210, a movable member 220 and an elastic member 230.

The transparent member 210 is made of a material, such as glass or plastics, through which a laser beam passes. The transparent member 210 is generally formed by injection molding. The transparent member 210 has a predetermined optical refractivity, and it is possible that the refractivity is more than 1. A cross-section of the transparent member 210 may vary in thickness in accordance with a direction (sub-scanning direction; arrow C) perpendicular to a height, i.e., to a laser scanning direction (arrow B). It is possible that the lower portion is thicker while an upper portion is thinner. FIG. 9 shows one example of a structure of the transparent member 210 in cross-section, which has a shape of a trapezoid. Alternatively, the transparent member 210 may be a triangle in cross-section.

The movable member 220 is formed to push a lower side 211 of the transparent member 210 upward in full-contact and provided with a driving unit (not shown) moving the movable member 220 upward and downward, i.e., in the sub-scanning direction (arrow C). Accordingly, as the movable member 220 is moved upward and downward, the transparent member 210 is moved upward and downward (the arrow C). The driving unit may be any proper device that can reciprocate the movable member 220 in a linear direction with accuracy. For example, precision screw devices can be used as the driving unit.

The elastic member 230 is placed on the transparent member 210, pressing the transparent member 210 with a predetermined pressure with respect to the movable member 220. Being secured in a certain position of a frame 235 of a scanning unit, the elastic member 230 also serves to secure the transparent member 210 at a certain position in an optical path of the laser beam. The elastic member 230 is made of any material that has a flexibility, and a compression spring can be used for the elastic member 130.

An operation of the sub-scanning interval adjusting apparatus 200 for the multi-beam scanning unit having the above structure, will be described below.

When two laser lines are concentrated on a photoreceptor drum 17 (FIG. 1) at an interval deviated from a predetermined laser line, by driving the driving unit, the movable member 220 is moved upward and downward, i.e., in the sub-scanning direction. If the movable member 120 is moved downward, the transparent member 210 is also moved, causing the transparent member 210 to be moved downward smoothly by a recovering force of the elastic member 230. As the transparent member 210 is moved upward and downward with respect to the optical path of the two laser beams, the optical path changes by the transparent member 210, and as a result, the interval between the two laser lines can be adjusted.

In accordance with the present invention as described above, the interval between the two laser beams can be adjusted with ease, and without varying starting positions of the image formation of the laser beams in the scanning direction.

Although a few preferred embodiments of the present invention have been described, it will be understood by those skilled in the art that the present invention should not be limited to the described preferred embodiments, but various changes and modifications can be made within the spirit and scope of the present invention as defined by the appended claims and their equivalents.

What is claimed is:

1. A sub-scanning interval adjusting apparatus adjusting an interval between at least two laser beams for a multi-beam laser scanning unit, comprising:
   a transparent member arranged on an optical path of the at least two laser beams and which adjusts the interval between the at least two laser beams when moved, the transparent member having an inclined lower side inclined with respect to a scanning direction of the at least two laser beams; and
   a slidable transparent member mover which moves the transparent member when slid and has an inclined side corresponding to the inclined lower side of the transparent member.

2. The sub-scanning interval adjusting apparatus of claim 1, wherein the transparent member comprises:
   a triangular shape in cross-section in the direction where the at least two laser beams pass through.

3. The sub-scanning interval adjusting apparatus of claim 1, wherein the transparent member comprises:
   a trapezoidal shape in cross-section in the direction where the at least two laser beams pass through.

4. A sub-scanning interval adjusting apparatus adjusting an interval between at least two laser beams for a multi-beam laser scanning unit, comprising:
   a transparent member having a thickness varying depending on a height thereof perpendicular to a direction where the at least two laser beams pass through and having an inclined lower side inclined with respect to a scanning direction of the at least two laser beams; and
   a slidable movable member which moves the transparent member in a height direction of the transparent member when slid, the slidable movable member having an inclined side corresponding to the inclined lower side of the transparent member, wherein the interval between the at least two laser beams is adjusted by varying the height of the transparent member with respect to the at least two laser beams.

5. The sub-scanning interval adjusting apparatus of claim 4, wherein the transparent member comprises:
a triangular shape in cross-section in the direction where the at least two laser beams pass through.

6. The sub-scanning interval adjusting apparatus of claim 4, wherein the transparent member comprises:
a trapezoidal shape in cross-section in the direction where the at least two laser beams pass through.

7. The sub-scanning interval adjusting apparatus of claim 4, wherein the transparent member has an optical refractivity equal to or great than 1.

8. The sub-scanning interval adjusting apparatus of claim 4, further comprising:
an elastic member pressing the transparent member against the movable member.

9. The sub-scanning interval adjusting apparatus of claim 4, wherein the transparent member is made either of glass or plastic by injection molding.

10. A sub-scanning interval adjusting apparatus adjusting an interval between at least two laser beams for a multi-beam laser scanning unit, the apparatus comprising:
a transparent member having a thickness varying depending on a height thereof perpendicular to a direction where the at least two laser beams pass through, and having an inclined lower side inclined with respect to a scanning direction of the at least two laser beams; and
a movable member having an inclined side corresponding to the inclined lower side of the transparent member,
wherein the interval between the at least two laser beams is adjusted by moving the movable member in the scanning direction and thus varying a height of the transparent member with respect to the at least two laser beams.

11. The sub-scanning interval adjusting apparatus of claim 10, wherein the transparent member comprises:
a triangular shape in cross-section in the direction where the at least two laser beams pass through.

12. The sub-scanning interval adjusting apparatus of claim 10, wherein the transparent member comprises:
a trapezoidal shape in cross-section in the direction where the at least two laser beams pass through.

13. The sub-scanning interval adjusting apparatus of claim 10, wherein the transparent member has an optical refractivity equal to or greater than 1.

14. The sub-scanning interval adjusting apparatus of claim 10, further comprising:
an elastic member pressing the transparent member with respect to the movable member.

15. The sub-scanning interval adjusting apparatus of claim 10, wherein the transparent member is made either of glass or plastic by injection molding.

16. A sub-scanning interval adjusting apparatus adjusting an interval between first and second laser beams respectively emitted by first and second diodes along respective first and second optical paths spaced apart from each other in a multi-beam laser scanning unit, comprising:
a transparent member disposed on the first and second optical paths of the first and second laser beams, and having a first thickness corresponding to the first optical path of the first laser beam, a second thickness corresponding to the second optical path of the second laser beam in an optical path direction of the first and second optical paths, and an inclined lower side inclined with respect to a scanning direction of the first and second laser beams; and
a slidable moving member which controls the transparent member to adjust the first thickness and the second thickness of the transparent member when slid so as to adjust the interval between the first and second laser beams, the slidable moving member having an inclined side corresponding to the inclined lower side of the transparent member.

17. The sub-scanning interval adjusting apparatus of claim 16, wherein the first and second laser diodes simultaneously emit the first and second laser beams toward the transparent member.

18. The sub-scanning interval adjusting apparatus of claim 16, wherein the first and second laser diodes simultaneously emit the first and second laser beams parallel to each other by an initial interval which is changed to the interval by the transparent member.

19. The sub-scanning interval adjusting apparatus of claim 16, wherein the moving member moves the transparent member in a direction perpendicular to a line passing through the first and second optical paths to change the first thickness and the second thickness, and the first and second laser diodes are disposed in the direction perpendicular to the line passing through the first and second optical paths.

20. The sub-scanning interval adjusting apparatus of claim 16, wherein the first and second laser beams form an initial interval in a direction perpendicular to the optical path direction of the first and second optical paths when being incident to the transparent member and form the interval greater than the initial interval when exiting the transparent member.

21. The sub-scanning interval adjusting apparatus of claim 16, wherein the first thickness and the second thickness of the transparent member are not the same.

22. The sub-scanning interval adjusting apparatus of claim 16, wherein the first thickness and the second thickness simultaneously increase or decrease when the moving member moves the transparent member in a direction having an angle with the optical path direction of the first and second optical paths.

23. The sub-scanning interval adjusting apparatus of claim 16, further comprising:
a frame on which the transparent member is movably disposed.

24. The sub-scanning interval adjusting apparatus of claim 23, further comprising:
an elastic member coupled between the transparent member and the frame to bias the transparent member with respect to the frame.

25. The sub-scanning interval adjusting apparatus of claim 24, wherein the frame, the transparent member, and the moving member are disposed in a direction perpendicular to the optical path direction.

26. The sub-scanning interval adjusting apparatus of claim 24, further comprising:
a driving unit moving the moving member to move the transparent member in a direction having an angle with the optical path direction.

27. The sub-scanning interval adjusting apparatus of claim 16, wherein the transparent member narrows in a direction having an angle with the optical path direction.

28. The sub-scanning interval adjusting apparatus of claim 16, wherein the transparent member moves in a direction having an angle with the optical path direction to change the first thickness and the second thickness in response to a movement of the moving member.

29. The sub-scanning interval adjusting apparatus of claim 16, wherein the transparent member comprises:
  incident and exit surfaces disposed on the first and second optical paths to be spaced-apart from each other by a variable thickness including the first thickness and the second thickness.

30. A sub-scanning interval adjusting apparatus adjusting an interval between first and second laser beams respectively emitted by first and second diodes along respective first and second optical paths spaced apart from each other in a multi-beam laser scanning unit, comprising:
  a transparent member disposed on the first and second optical paths of the first and second laser beams, and having a first thickness corresponding to the first optical path of the first laser beam and a second thickness corresponding to the second optical path of the second laser beam in an optical path direction of the first and second optical paths;
  a slidable moving member which controls the transparent member to adjust the first thickness and the second thickness of the transparent member when slid so as to adjust the interval between the first and second laser beams;
  a frame on which the transparent member is movably disposed; and
  an elastic member coupled between the transparent member and the frame to bias the transparent member with respect to the frame,
  wherein the moving member is disposed opposite to the elastic member with respect to the transparent member to move the transparent member with respect to the frame and the elastic member.

31. A sub-scanning interval adjusting apparatus adjusting an interval between first and second laser beams respectively emitted by first and second diodes along respective first and second optical paths spaced apart from each other in a multi-beam laser scanning unit, comprising:
  a transparent member disposed on the first and second optical paths of the first and second laser beams, and having a first thickness corresponding to the first optical path of the first laser beam and a second thickness corresponding to the second optical path of the second laser beam in an optical path direction of the first and second optical paths; and
  a slidable moving member which controls the transparent member to adjust the first thickness and the second thickness of the transparent member when slid so as to adjust the interval between the first and second laser beams,
  wherein the transparent member includes a first inclined surface inclined with respect to the first and second optical paths and the moving member includes a second inclined surface corresponding to the first inclined surface of the transparent member.

32. The sub-scanning interval adjusting apparatus of claim 31, wherein the first inclined surface and the second inclined surface are disposed in a direction having an angle with the optical path direction of the first and second optical paths.

33. The sub-scanning interval adjusting apparatus of claim 31, wherein the transparent member moves in a direction perpendicular to the optical path direction when the moving member moves in the optical path direction.

34. The sub-scanning interval adjusting apparatus of claim 31, wherein the first inclined surface of the transparent member slides along the second surface of the moving member in a direction having an angle with the optical path direction.

35. A sub-scanning interval adjusting apparatus adjusting an interval between first and second laser beams respectively and simultaneously emitted by first and second diodes along respective first and second optical paths spaced apart from each other in a multi-beam laser scanning unit, the apparatus comprising:
  a transparent member disposed on the first and second optical paths of the first and second laser beams, narrowing in a direction having an angle with an optical path direction of the first and second optical paths, and having an inclined lower side inclined with respect to a scanning direction of the at least two laser beams; and
  a slidable moving member which moves the transparent member when slid so as to adjust the interval between the first and second laser beams, the slidable moving member having an inclined side corresponding to the inclined lower side of the transparent member.

36. A multi-beam laser scanning unit having an interval between two laser beams, the multi-beam laser scanning unit comprising:
  a sub-scanning interval adjusting apparatus comprising
    a transparent member disposed on the first and second optical paths of first and second laser beams respectively emitted by first and second diodes along respective first and second optical paths spaced apart from each other to narrow in a direction having an angle with an optical path direction of the first and second optical paths and having an inclined lower side inclined with respect to a scanning direction of the at least two laser beams, and
    a slidable moving member which moves the transparent member when slid so as to adjust the interval between the first and second laser beams, the slidable moving member having an inclined side corresponding to the inclined lower side of the transparent member; and
  a photoreceptor drum on which the first and second laser beams form first and second scan lines spaced-apart from each other by a distance corresponding to the interval.

37. The multi-beam laser scanning unit of claim 36, further comprising:
  a polygon mirror disposed between the sub-scanning interval adjusting apparatus and the photoreceptor drum to direct the first and second laser beams toward the photoreceptor drum, respectively.

38. The multi-beam laser scanning unit of claim 37, further comprising:
  an f-θ lens disposed between the polygon mirror and the photoreceptor drum to focus the first and second laser beams on the photoreceptor drum.

39. The multi-beam laser scanning unit of claim 36, wherein the first and second laser diodes simultaneously emit the first and second two laser beams, respectively, and the first and second scanning lines are simultaneously formed on the photoreceptor drum.

40. The multi-beam laser scanning unit of claim 36, wherein the first and second scanning lines are formed in a scanning direction, and the first and second scanning lines are spaced-apart from each other in a sub-scanning direction perpendicular to the scanning direction.

41. The multi-beam scanning unit of claim 36, wherein the transparent member comprises:

a first thickness corresponding to the first optical path of the first laser beam in the optical path direction; and a second thickness corresponding to the second optical path of the second laser beam in the optical path direction.

42. The multi-beam scanning unit of claim 36, wherein the first scanning line of the first laser beam has a first starting point of the photoreceptor corresponding to a reference point, and the second scanning line of the second laser beam has a second starting point corresponding to the reference point.

43. The multi-beam scanning unit of claim 36, wherein the first and second laser beams are disposed in parallel in the direction perpendicular to the optical path direction of the first and second optical paths.

44. The multi-beam scanning unit of claim 36, wherein the first and second start points of the first and second scanning lines do not vary when the distance of the first and second scanning lines varies according to adjustment of the interval of the first and second laser beams.

* * * * *

UNITED STATES PATENT AND TRADEMARK OFFICE
CERTIFICATE OF CORRECTION

PATENT NO. : 7,050,083 B2  
APPLICATION NO. : 10/437185  
DATED : May 23, 2006  
INVENTOR(S) : Jae-hwan Yoo Page 1 of 1

It is certified that error appears in the above-identified patent and that said Letters Patent is hereby corrected as shown below:

Column 9, Line 14, change "great" to --greater--.

Signed and Sealed this

Twenty-eighth Day of November, 2006

JON W. DUDAS  
*Director of the United States Patent and Trademark Office*